United States Patent [19]

Mizuno et al.

[11] 4,381,929
[45] May 3, 1983

[54] APPARATUS FOR ADSORBING FUEL VAPOR

[75] Inventors: Junzi Mizuno, Okazaki; Yukihisa Takeuchi, Aichi; Akira Fukami, Okazaki; Masao Wakayama, Nagoya; Masahiro Tomita, Anjo, all of Japan

[73] Assignee: Nippon Soken, Inc., Nishio, Japan

[21] Appl. No.: 256,663

[22] Filed: Apr. 22, 1981

[30] Foreign Application Priority Data

Apr. 25, 1980 [JP] Japan ................. 55/55864
Jun. 9, 1980 [JP] Japan ................. 55/78043

[51] Int. Cl.³ ............................................. B01D 53/04
[52] U.S. Cl. .................................... 55/316; 55/387;
55/528; 55/DIG. 42; 123/519; 252/444
[58] Field of Search ......... 55/316, 387, 528, DIG. 42;
123/518–521; 252/421, 444

[56] References Cited

U.S. PATENT DOCUMENTS

| | | | |
|---|---|---|---|
| 2,933,455 | 4/1960 | Doying | 252/444 X |
| 3,091,550 | 5/1963 | Doying | 252/444 X |
| 3,687,297 | 8/1972 | Kuhn et al. | 55/387 X |
| 3,730,158 | 5/1973 | St. Amand | 123/519 |
| 3,865,758 | 2/1975 | Yoshida et al. | 55/387 X |
| 3,960,770 | 6/1976 | Raley, Jr. et al. | 252/444 |
| 4,102,816 | 7/1978 | Stalling et al. | 252/444 X |
| 4,154,704 | 5/1979 | Vinton et al. | 252/444 |
| 4,173,207 | 11/1979 | Hiramatsu | 123/519 |
| 4,239,516 | 12/1980 | Klein | 252/444 X |
| 4,308,233 | 12/1981 | Narumiya et al. | 422/180 X |

*Primary Examiner*—Robert H. Spitzer
*Attorney, Agent, or Firm*—Cushman, Darby & Cushman

[57] ABSTRACT

An apparatus for adsorbing fuel vapor having a fuel vapor inlet hole communicating to a fuel tank, a mixed gas outlet hole communicating to the intake passage for internal combustion engine, an inlet hole for the desorbent air communicating to the atmospheric air and an adsorbent for adsorbing fuel vapor and by using, as to the adsorbent which is at least partially foamed body of active charcoal constituting a three-dimensional network cell structure having an inner communicating space between granular active charcoals.

5 Claims, 9 Drawing Figures

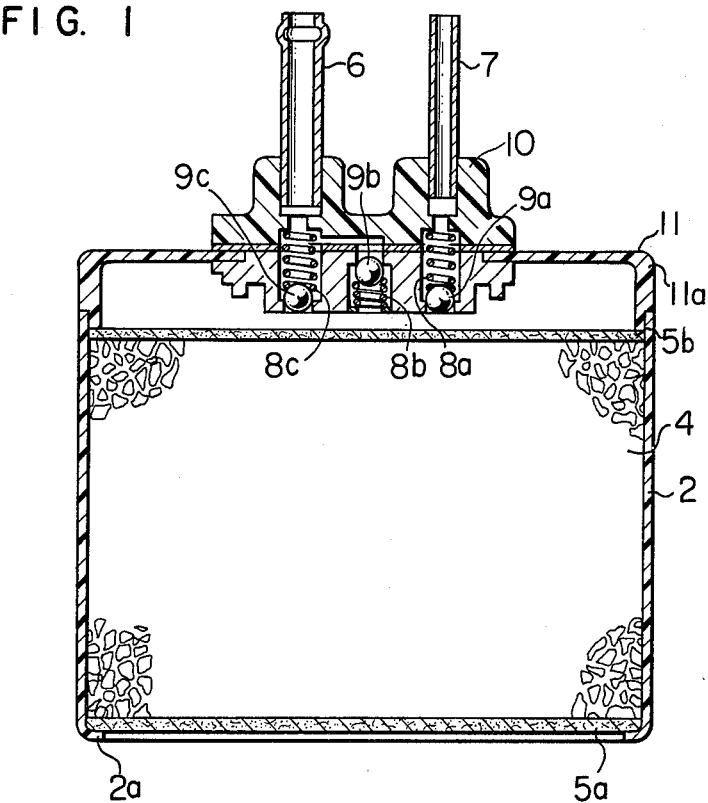
FIG. 1
FIG. 2
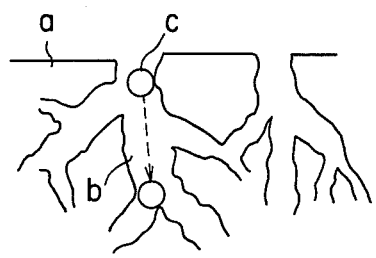
FIG. 3
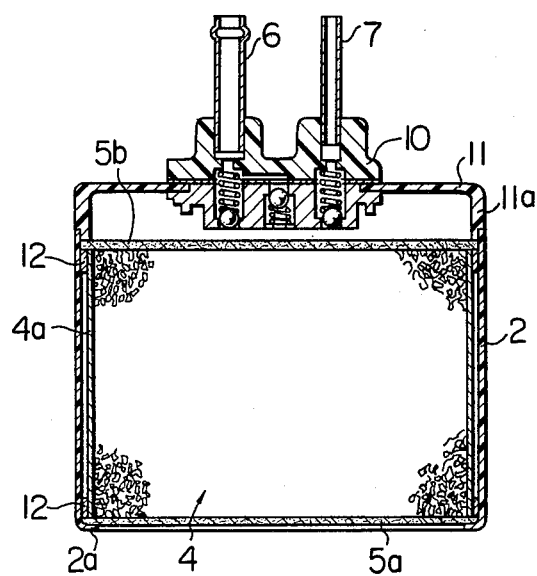

(a)

(b)

APPARATUS FOR ADSORBING FUEL VAPOR

The invention relates to an apparatus for adsorbing fuel vapor for internal combustion engine, and more particularly to an adsorbent used therefor.

Hitherto, in this sort of apparatuses for adsorbing fuel vapor used, for example, for preventing the escape of the vapor into the air, the apparatus was usually so constructed that pellet-formed active charcoal as an adsorbent was packed into canister. In this type of apparatus, the flow of fuel vapor in the canister could not reach all the corners of adsorbent or the packed pellet-formed active charcoal exercised a high resistance to the flow of fuel vapor so that no sufficient effect was obtained in the adsorption of fuel vapor.

It is the object of this invention to provide, in order to overcome the faults in the hitherto known this sort of apparatus for adsorbing fuel vapor, an apparatus for adsorbing vapor of fuel for automobiles having a simple structure and a light-weight structure wherein an active charcoal having at least partially foamed body, constituting a three-dimensional network cell structure having an inner communicating space between granular active charcoal itself due to the vibration or the like which the active charcoal always undergoes in running cars is prevented, the flow of fuel vapor in the apparatus is improved and the adsorbing ability in the whole adsorbent layer is made effectively utilizable.

BRIEF EXPLANATION OF THE DRAWINGS

FIG. 1 is a sectional view illustrating an example of the apparatus of this invention.

FIG. 2 is a diagrammatical view illustrating the principle of the adsorption onto active charcoal.

FIGS. 3-5 are sectional views illustrating other examples of the apparatus of this invention.

Figure 4:
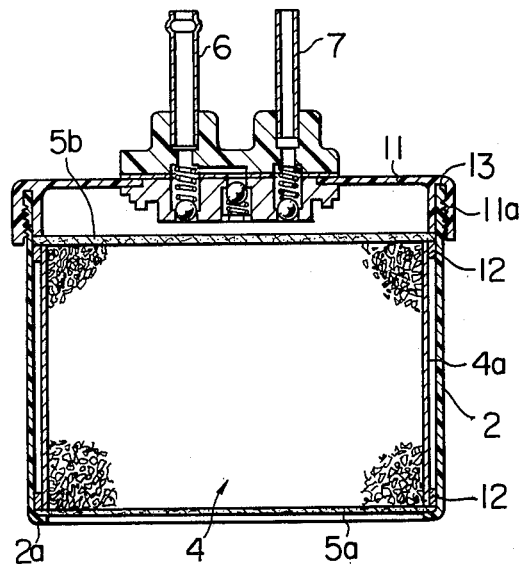

Hereunder, this invention will be explained with reference to the following examples.

EXAMPLE 1

Here will be explained an example of the process for producing foamed body-like active charcoal.

150 Grams of powdered lignin, 800 milliliters of water and 11 grams of methyl cellulose were added to 100 grams of a 200 mesh powder of coal origin active charcoal, and thoroughly mixed together by means of a stirrer. Then, a desired form of open cell-type polyurethane foam having no cell membrane and composed only of skeleton, having 6 mesh of air holes, was dipped in the above-mentioned mixed fluid, after which the excessive mixed fluid was removed by means of centrifugal separator at a rotation of 100 rpm. The dipped polyurethane foam was dried at 120° C. for 60 minutes and then the above-mentioned procedure was repeated again, whereby predetermined quantities (about 0.5 g/cm$^3$) of active charcoal powder, lignin powder and methyl cellulose were attached to the polyurethane foam. Subsequently it was fired at 600–1,000° C. in an atmosphere of nitrogen to decompose the polyurethane foam, the lignin and the methyl cellulose, whereby a foamed active charcoal was obtained.

EXAMPLE 2

In FIGS. 1 and 2, cylindrical foamed active charcoal 4 having continuous passages between the up and down end surfaces of container 2 is placed in the synthetic resin-made container 2 with filters 5a and 5b made of, for example, an unwoven cloth attached to its both end surfaces. On one end of container 2 are welded fuel vapor inlet tube 6, mixed gas outlet tube 7, springs 8a-8c, check valves 9a-9c and synthetic resin-made lid 11 equipped with base 10. On the other end of container 2 is placed the filter 5a. The filters 5a and 5b so act as to prevent the entrance of foreign matter contaminating the desorbent air into the combustion chamber of engine. Leg 11a of lid 11 forms a space between the lid and container 2 and, at the same time, tightly fixes foamed active charcoal 4. Container 2 and lid 11 may optionally be made of a metal. In such a case, it is also possible to bind them by rolling in the conventional manner.

The fuel vapor generated in fuel tank passes fuel vapor inlet tube 6 and check valve 9b to enter the space between container 2 and lid 11. Owing to the existence of filter 5b, the fuel vapor uniformly extends over the space and meanwhile it passes filter 5b to flow into foamed active charcoal 4. It is adsorbed and retained there when it passes inside the foamed active charcoal 4.

On the other hand, when the engine is being operated while satisfying a certain condition (a condition under which the desorbed fuel vapor may enter the suction pipe of engine together with the desorbent air as a gas mixture), the desorbent air is introduced from desorbent air intake 2a at the bottom of container 2 into container 2 by the vacuum generated by the engine, passes filter 5a and flows to foamed active charcoal 4. At this time, it desorbs the adsorbed and retained fuel vapor and regenerates the adsorbing ability of foamed active charcoal 4, after which it passes filter 5b as a mixed gas, passes check valve 8a, mixed gas outlet tube 7 and suction pipe and is introduced into the combustion chamber where it burns.

Here, the adsorbing action of active charcoal is a physical phenomenon caused by the entrance of adsorbed molecule c into pore b of active charcoal a. The adsorbed molecule c gets into the deeper position of pore b with time, which is followed by adsorption of the next adsorbed molecule c. At the time of desorption, a reverse phenomenon takes place. Accordingly, the occurrence of desorption becomes more difficult as the adsorbed molecule c reaches a more deeper position of pore b.

Since the adsorbents used in an apparatus for preventing the vaporization of fuel are fundamentally grounded on regeneration cycle in general, adsorbent having a higher velocity of adsorption and a more excellent desorbing action are more preferable. In this case, air of ordinary temperature is generally used as the means for desorption. Therefore, one of the means thought of may be to make the wall thickness of active charcoal thinner and thinner.

However, in the case of hitherto known granular active charcoals, thinning wall thickness requires to decrease particle size. As the particle size decreases, there arise such bad effects that resistance to gas flow increases, desorbent air cannot be supplied sufficiently, and so on.

On the other hand, in the foamed active charcoal of this invention, the surface area of adsorption can be increases and, at the same time, the resistance to gas flow can be made lower than in granular active charcoal by making the network of the skeleton part fine and dense.

Figure 6:
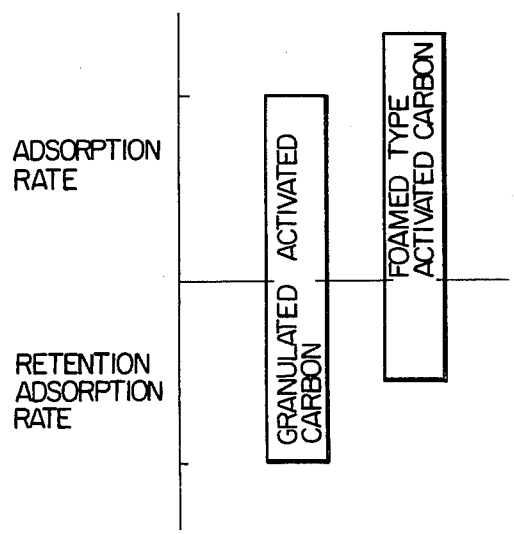
FIG. 6 is a characteristic graph for illustrating the effect of this invention.

The adsorption performances of the foamed active charcoal of this invention and hitherto known granular active charcoal are compared in FIG. 6, wherein rate of adsorption means a value obtained by deducting the residual weight of adsorbed fuel vapor from the weight of adsorbed fuel vapor and then dividing the difference by the weight of active charcoal, as represented by the following equation:

$$\text{Rate of adsorption (\%)} = \frac{\begin{pmatrix}\text{Weight of}\\\text{adsorbed}\\\text{fuel vapor}\end{pmatrix} - \begin{pmatrix}\text{Residual weight}\\\text{of adsorbed}\\\text{fuel vapor}\end{pmatrix}}{[\text{Weight of active charcoal}]} \times 100$$

and rate of residual adsorption means a value obtained by dividing the residual weight of adsorbed fuel vapor by the weight of active charcoal, as represented by the following equation:

$$\text{Rate of residual adsorption (\%)} = \frac{\text{Residual of adsorbed fuel vapor}}{\text{Weight of active charcoal}} \times 100$$

From FIG. 6, it is understandable that excellent performances can be exhibited by the use of foamed active charcoal.

Since foamed active charcoal is an integrally formed product, it does not undergo pulverization upon vibration or the like unlike granular active charcoals, so far as it is perfectly fixed in a container. Further, since it is an integrally formed product, the construction of container can be simplified, the foamed active charcoal can be formed into a package and it becomes possible to exchange only adsorbent. Further, since the resistance to gas flow is smaller than in the case of granular active charcoal as has been mentioned above, the capacity can be increased easily.

EXAMPLE 3

FIG. 3 illustrates another example of this invention. In FIG. 3, the circumference of foamed active charcoal 4 is integrally surrounded by a thin wall of active charcoal 4a and the up and down sides of the thin wall 4a are tightly coated with a heat-shrinkable silicone rubber tube 12. When foamed active charcoal 4 is fixed on container 2, thin wall 4a acts so as to protect foamed active charcoal 4 and to increase its strength and, at the same time, to prevent that fuel vapor and desorbent air blow away from the side wall of foamed active charcoal 4. Heat-shrinkable silicone rubber tube 12 has an action as a buffer material for protecting foamed active charcoal 4 against the external impacts exercised to container 2 and an action as a sealing material for preventing that the vaporized fuel and the desorbent air flow away from the interstices between container 2 and thin wall 4a.

It is also allowable that the heat-shrinkable silicone rubber tube 12 covers the whole side wall of foamed active charcoal 4. In this case, thin wall 4a may optionally be absent. Further, heat-shrinkable silicone rubber tube 12 may also be absent, if the thin wall 4a is inserted into container 2 with a close contact therewith. Aside from heat-shrinkable silicone rubber tube 12, any material may be used so far as it has a resistance to gasoline and a shrinkability.

EXAMPLE 4

FIG. 4 illustrates another example of this invention. This example is characterized in that lid 11 and container 2 are detachable. By this, it is possible to exchange only foamed active charcoal 4 and to form foamed active charcoal 4 into a package. Numeral 13 is an O ring.

EXAMPLE 5

Figure 5:
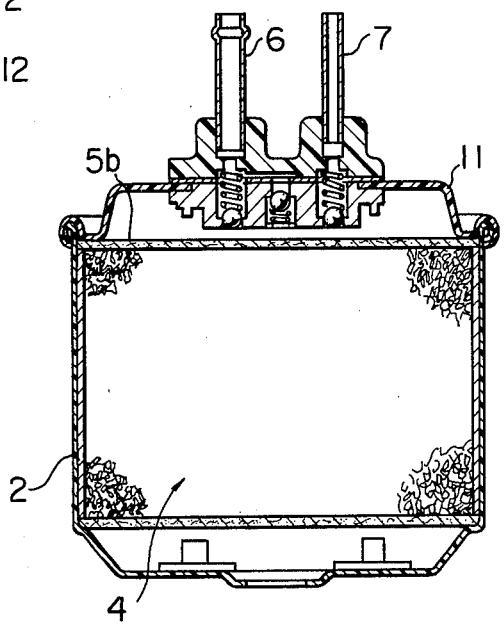

FIG. 5 illustrates another example of this invention, wherein hitherto known container is used without any alteration. When compared with FIG. 2, the plate and the pre-pressurizing spring can be omitted.

EXAMPLE 6

Figure 7:
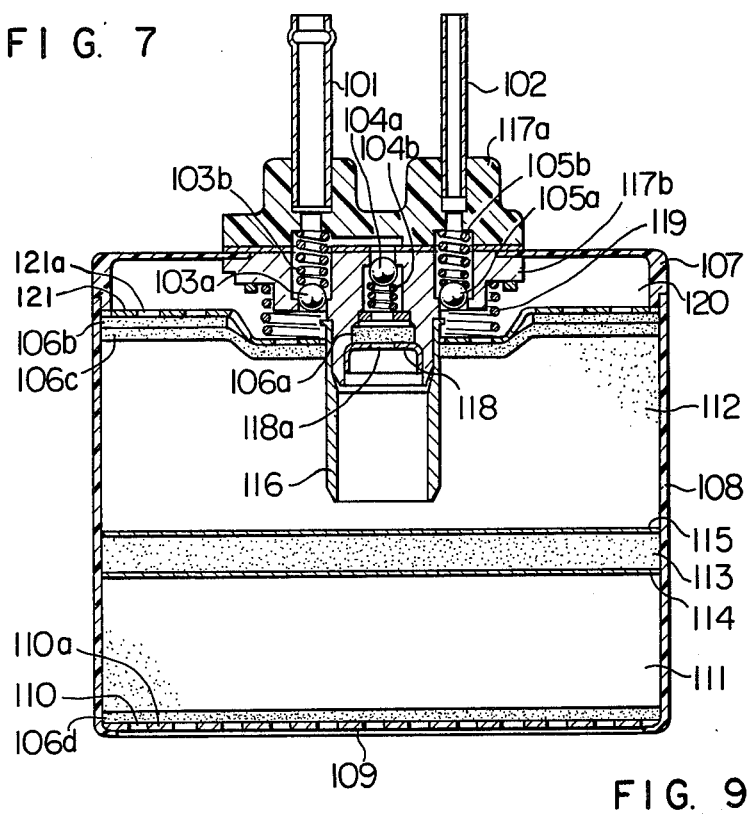
FIG. 7 is a sectional view illustrating the apparatus of this invention.
Figure 8:
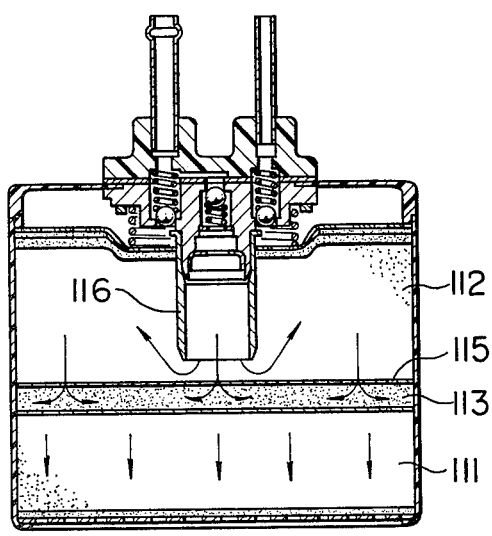
FIG. 8 is a sectional view illustrating the flow of fuel vapor in the apparatus of FIG. 7.
Figure 9:
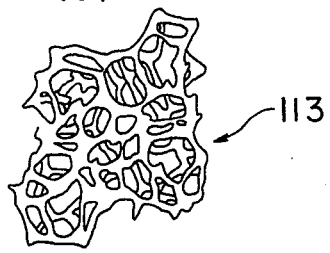
FIG. 9(b) is a perspective partial sectional view illustrating the foamed active charcoal used in the apparatus of FIG. 7.
FIG. 9(a) is a partially enlarged perspective view of FIG. 9(b).
Figure 9:
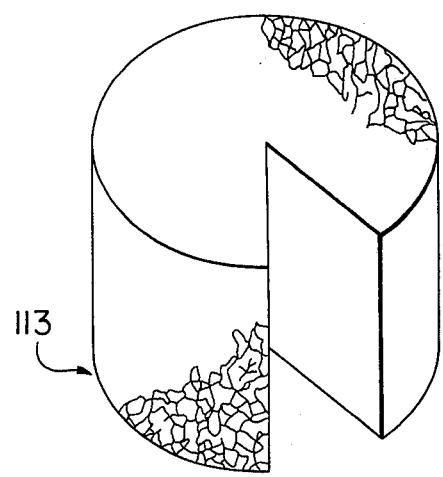

In FIGS. 7 and 8, numeral 101 is a fuel vapor inlet tube which communicates to the fuel vapor generating source such as fuel tank or float chamber of carburetor. Numeral 102 is a mixed gas outlet tube which communicates to the upstream side of throttle valve of intake pipe of internal combustion engine. Numerals 103a, 104a and 105a are check valves, and 103b, 104b and 105b are springs for check valves. Numeral 106a is a filter attached to fitting base 117b among the two fitting bases 117a and 117b, which is composed of, for example, an unwoven cloth. This filter 106a is fixed by means of fastening fitting 118 having a small hole 118a at its center for the sake of preventing falling off. Numerals 106b, 106c and 106d are also filters.

The above-mentioned two fitting bases 117a and 117b are fitted to the resin-made lid 107. Numeral 108 is a synthetic resin-made container with both ends open, of which one open end serves as desorbent air inlet hole 109. This inlet part 109 is fitted with plate 110a having many small holes 110, and the filter 106d is laid on this plate 110a. On this filter 106d, granular active charcoals 111 and 112 are packed in a state that cylindrical foamed active charcoal 113 intervenes between them. Numerals 114 and 115 are filters composed of an unwoven cloth and placed between granular active charcoals 112 and 113 and foamed active charcoal 113. Numeral 116 is a pipe which is fixed on the above-mentioned base 117b and of which inside is packed with the above-mentioned granular active charcoal 112. On the upper side of granular active charcoal 112 are placed the above-mentioned filters 106b and 106c. Among them, on the filter 106b is arranged plate 121 having many small holes 121a. Said lid 107 is welded and fixed on the other open end of container 108 via spring 119. By this spring 119, granular active charcoals 111 and 112 and foamed active charcoal 113 in container 108 are certainly fixed so as to undergo no movement. Under lid 107, there is formed space 120.

Next, the working in the above-mentioned construction will be explained. The fuel vapor generated in fuel tank passes through fuel inlet tube 101, check valve 104a and filter 106a and enters pipe 116. Since foamed active charcoal 113 has a smaller resistance to gas flow than granular active charcoal 111 and 112 as has been mentioned above and is fitted with filters 114 and 115, a part of the fuel vapor released from pipe 116 flows into the upper layer region of granular active charcoal 112, as shown in FIG. 8. The fuel vapor which has passed filter 115 extends to the circumferential direction inside foamed active charcoal 113 and thereafter flows towards the under layer of granular active charcoal 111.

Accordingly, it is understandable that the adsorbent can be utilized more effectively in the present example than in this type of fuel vapor adsorbing apparatus.

When, for example, the internal combustion engine of automobile is being worked while satisfying a certain condition, or a condition under which the fuel vapor desorbed may enter together with the desorbent air as a mixed gas into the suction part of engine, the desorbent air passes desorbent air inlet hole 109 and is led into container 108 by the vacuum generated in the engine, after which it passes filter 106d and flows into granular active charcoals 111 and 112 and foamed active charcoal 113. At this time, the fuel vapors adsorbed and retained on active charcoals 111, 112 and 113 are desorbed and regenerate the adsorbing ability of the active charcoals, after which they pass through filters 106b and 106c as a mixed gas, pass through check valve 105a, mixed gas outlet tube 102 and the suction part of engine and then are led into the combustion chamber where they burn.

The effects of this invention mentioned above can be summarized as follows:

(1) Since the foamed active charcoal is a three-dimensional network of an integrally formed product having an inner communicating space, it does not rub against one another and does not undergo pulverization upon vibration or the like.

(2) Since the pulverization of adsorbent does not occur, the increase in the resistance to gas flow due to the clogging of filter does not occur and the adsorbent is excellent in resistance to vibration.

(3) Since the foamed active charcoal is an integrally formed product constituting a porous structure, it needs no mechanism for pre-pressuring or supporting the adsorbent layer, the construction of apparatus can be simplified relatively and the number of man-hour for assembling and the weight can be reduced, as compared with the case of granular active charcoal.

(4) In foamed active charcoal, the skeleton part can be made to have a slender and dense structure and therefore it has a high velocity of adsorption, is excellent in desorbability and has a low resistance to gas flow. Accordingly, it exhibits an excellent ability as an adsorbent for fuel vaporization preventing apparatus as compared with hitherto known granular active charcoal.

(5) Since its resistance to gas flow is low, the capacity can be increased easily.

(6) Since it is an integrally formed product, it can be formed into package and, as the result, it is easy to exchange only adsorbent.

This invention is not limited to the above-mentioned examples, but it can be modified in various manners as mentioned below:

(1) The flow of fuel vapor can be improved as compared with that in the hitherto known apparatuses, even if the upper and lower filters 114 and 115 of foamed active charcoal 113 are omitted. In this case, the surface layer of foamed active charcoal 113 directly supports the granular active charcoal layers 111 and 112.

(2) Similarly, it is also allowable to omit the upper and lower filters 114 and 115 of foamed active charcoal 113 so as to make the foamed active charcoal 113 into a double layer structure. In this case, the foamed active charcoal recommendably has such a construction that the foamed active charcoal has fine meshes of network to heighten the resistance to gas flow in the side adjacent to the upper granular active charcoal 112 and it has coarse meshes of network to lessen the resistance to gas flow in the side adjacent to the lower granular active charcoal 111.

What is claimed is:

1. An apparatus for adsorbing fuel vapor comprising: a container having side walls and opposed ends; a fuel vapor inlet in one of said ends for introducing the fuel vapor into the container; a gas outlet in the other if said ends for taking the air-fuel mixture out from the container; an air inlet for introducing the air into the container for desorbing the fuel vapor; an adsorbent being set in the container, for adsorbing the fuel vapor said adsorbent containing a foamed body of active charcoal constituting a three-dimensional network cell structure having an inner communicating space; and a thin sleeve of active charcoal snugly surrounding the foamed body between the latter and said side walls.

2. An apparatus according to claim 1, wherein said adsorbent is a foamed body of active charcoal obtained by dipping a polyurethane foam constituting a three-dimensional network cell structure having a communicating space having no cell membrane and composed only of skeleton into a mixed fluid comprising a powdered active charcoal, a powdered lignin, water and methyl cellulose, drying the polyurethane foam, repeating these procedures to let the charcoal powder, lignin powder and methyl cellulose adhere thereto and then firing the dipped product.

3. An apparatus according to claim 2, wherein said adsorbent is a foamed body of active charcoal obtained by firing said dipped product in which the amount of mixed fluid comprising powdered active charcoal, powdered lignin, water and methyl cellulose adhering to polyurethane foam is 0.5 g per 1 $cm^3$ of polyurethane foam based on the dried residue of said mixed fluid.

4. An apparatus according to claim 2, wherein said adsorbent is a foamed body of active charcoal obtained by firing said dipped product at a temperature of 600°–1,000° C.

5. An apparatus according to claim 2, wherein said adsorbent is a foamed body of active charcoal obtained by dipping polyurethane foam into a mixed fluid comprising powdered active charcoal, powdered lignin, water and methyl cellulose wherein the composition ratio of respective components is 100:150:80:11 (ratio by weight), drying the polyurethane foam to let the components adhere thereto and then firing it.

* * * * *